(12) United States Patent
Fukuroi (10) Patent No.: US 6,623,330 B2
(45) Date of Patent: Sep. 23, 2003

(54) LAPPING SENSOR USED IN FABRICATION OF MAGNETIC HEAD WITH MAGNETORESISTIVE EFFECT ELEMENT AND LAPPING CONTROL METHOD USING THE SENSOR

(75) Inventor: Osamu Fukuroi, Kwai Chung (HK)

(73) Assignee: SAE Magnetics (H. K.) Ltd., Kwai Chung (HK)

( * ) Notice: Subject to any disclaimer, the term of this patent is extended or adjusted under 35 U.S.C. 154(b) by 15 days.

(21) Appl. No.: 10/067,803

(22) Filed: Feb. 8, 2002

(65) Prior Publication Data

US 2002/0106974 A1 Aug. 8, 2002

(30) Foreign Application Priority Data

Feb. 8, 2001 (JP) ........................................ 2001-032171

(51) Int. Cl.[7] .............................................. B24B 49/00
(52) U.S. Cl. .............................. 451/5; 451/8; 29/603.1; 29/603.16
(58) Field of Search ............................. 451/5, 8, 9, 41; 29/603.09, 603.1, 603.16

(56) References Cited

U.S. PATENT DOCUMENTS

| 5,065,483 A | 11/1991 | Zammit |
| 5,210,667 A | 5/1993 | Zammit |
| 5,242,524 A | 9/1993 | Leach et al. |
| 5,361,547 A | 11/1994 | Church et al. |
| 5,997,381 A | 12/1999 | Dee et al. |
| 6,007,405 A | 12/1999 | Mei |
| 6,034,849 A | 3/2000 | Takizawa |
| 2002/0012204 A1 * | 1/2002 | Boutaghou et al. ......... 360/316 |

* cited by examiner

Primary Examiner—M. Rachuba
(74) Attorney, Agent, or Firm—Burns, Doane, Swecker & Mathis, L.L.P.

(57) ABSTRACT

A lapping sensor used in fabrication of a magnetic head with an MR element includes a resistor film with a resistance that varies depending upon a lapping amount, and a pair of connection pads formed on a element-forming surface of the magnetic head and electrically connected to both end sections of the resistor film. The pair of connection pads consist of a first connection pad and a second connection pad located nearer to a lapping surface than the first connection pad. One edge of the first connection pad is faced to one edge of the second connection pad and inclined toward the lapping surface.

19 Claims, 7 Drawing Sheets

LAPPING SENSOR USED IN FABRICATION OF MAGNETIC HEAD WITH MAGNETORESISTIVE EFFECT ELEMENT AND LAPPING CONTROL METHOD USING THE SENSOR

FIELD OF THE INVENTION

The present invention relates to a lapping sensor used in a height adjustment of a magnetoresistive effect (MR) film (MR-height adjustment) when a magnetic head with an MR element is fabricated, and to a lapping control method using the lapping sensor.

DESCRIPTION OF THE RELATED ART

In the MR-height adjustment process, MR heights of a plurality of MR elements are adjusted in one operation by polishing one surface (ABS, Air Bearing Surface) of a bar or block obtained by cutting a wafer so that a plurality of magnetic heads with the MR elements are aligned along the bar. In order to precisely and equally adjust MR heights of MR elements in one bar and MR heights of MR elements in bars, a lapping amount is controlled in response to electrical signals from a plurality of lapping sensors each called ELG (Electric Lapping Guide) or RLG (Resistance Lapping Guide), which are in general formed in each bar for detecting the lapped height of the bar. Bending of the bar may be additionally controlled in response to the electrical signals.

The ELG or RLG is substantially configured by a resistor film formed adjacent to and in line with the ABS to be lapped, and by a pair of connection pads electrically connected with both end sections of the resistor film. When lapping the MR height, the resistor film will be also lapped to decrease its height and to increase its electrical resistance. Thus, the lapped amount can be obtained from the change in a terminal voltage of the resistor film.

Such lapping sensors are disclosed in for example U.S. Pat. Nos. 5,065,483, 5,210,667, 5,242,524, 5,361,547, 5,997,381, 6,007,405 and 6,03,849.

In general, the pair of the connection pads for taking out the electrical signal from the resistor film of the lapping sensor are arranged on an element-forming surface of the bar side by side with terminal electrodes of magnetic heads.

Figure 1:
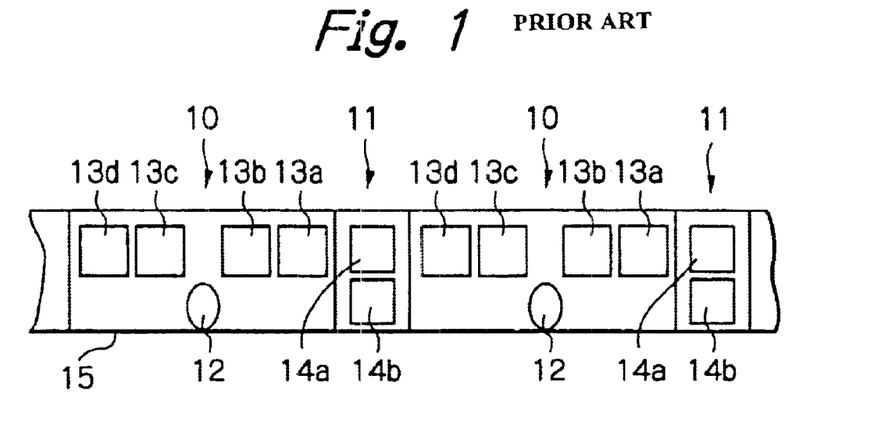
FIG. 1 already disclosed shows a plane view schematically illustrating the element-forming surface of a part of the conventional bar.

FIG. 1 shows a plane view schematically illustrating an element-forming surface of a part of a conventional bar obtained by cutting in lines an wafer on which many magnetic heads are formed in matrix.

In the figure, reference numerals 10 denote magnetic head sections, and 11 denote lapping sensor sections adjacent to the respective magnetic head sections 10. On the element-forming surface of each magnetic head section 10, four magnetic head connection pads 13a–13d electrically connected to a composite magnetic head element 12 consisting of an MR element and an inductive element are formed. On the element-forming surface of each lapping sensor section 11, two resistor-film connection pads 14a and 14b electrically connected to the resistor film, for extracting an electrical signal from the resistor film are aligned perpendicular to a surface to be lapped (lapping surface) 15 of the bar.

Such conventional structure had been applicable to a 30% magnetic head slider with a size of 1.0 mm×1.235 mm×0.3 mm. However, in case of a magnetic head slider with a size smaller than that of the 30% slider such as a 20% slider of 0.7 mm×0.85 mm×0.23 mm, since the space between the upper connection pad 14a and the lower connection pad 14b and also the space between the lower connection pad 14b and the lapping surface 15 became extremely narrow, the following problem had been occurred.

Figure 2:
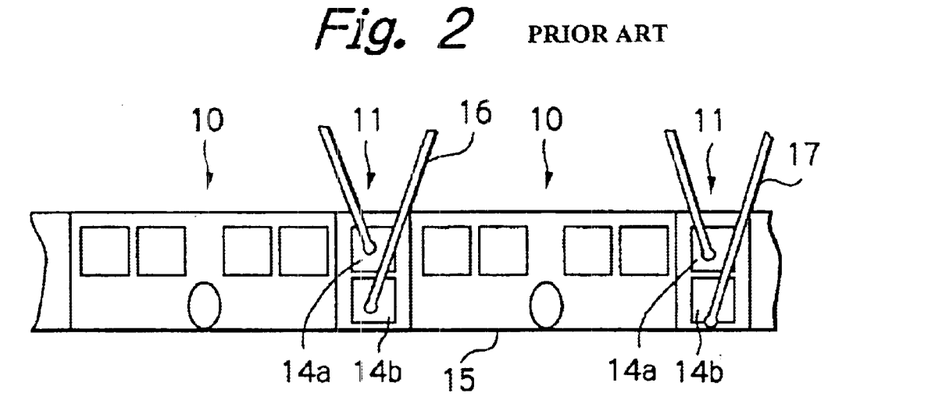
FIG. 2 already disclosed shows a plane view illustrating the element-forming surface where the wires are bonded to the connection pads shown in FIG. 1.

In the lapping control process, one end terminals of a printed circuit board (PCB) with the other end terminals to be electrically connected to a lapping control device are electrically connected to the resistor-film connection pads 14a and 14b by wires in general. If these spaces are too narrow, because a wire bonding machine has a limited accuracy in bonding, a wire 16 bonded to the lower connection pad 14b may come into contact with the upper connection pad 14a as shown in FIG. 2 causing a short circuit to occur, or a wire 17 bonded to the lower connection pad 14b may come into contact with a lapping plate touched with the lapping surface 15 as shown in FIG. 2

If the resistor-film connection pads 14a and 14b are short-circuited by the wire 16, the measured resistance of the lapping sensor will become lower than its actual resistance and thus an excess lapping may be occurred. Also, if the wire 17 touches the lapping plate, noises may be mixed in the measured signal due to current flowing into the lapping plate via the wire 17. Then, a correct resistance of the lapping sensor cannot be measured and a correct lapping cannot be expected.

Figure 3:
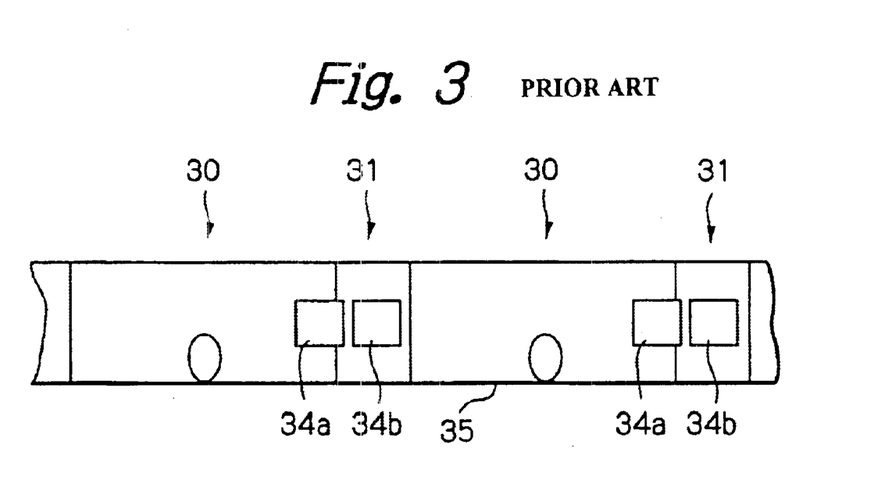
FIG. 3 already disclosed shows a plane view illustrating a layout example of the conventional connection pads.

In order to solve such problem, there may be an arrangement in which resistor-film connection pads 34a and 34b of the lapping sensor are aligned in parallel with a lapped surface 35 of a bar by forming the connection pad 34a over a lapping sensor section 31 and a magnetic head section 30 as shown in FIG. 3. However, this arrangement will make the layout design of magnetic head connection pads very difficult and also will expose the section of the resistor-film connection pad 34a when the magnetic head section 30 is separated by cutting from the section 31.

Figure 4:
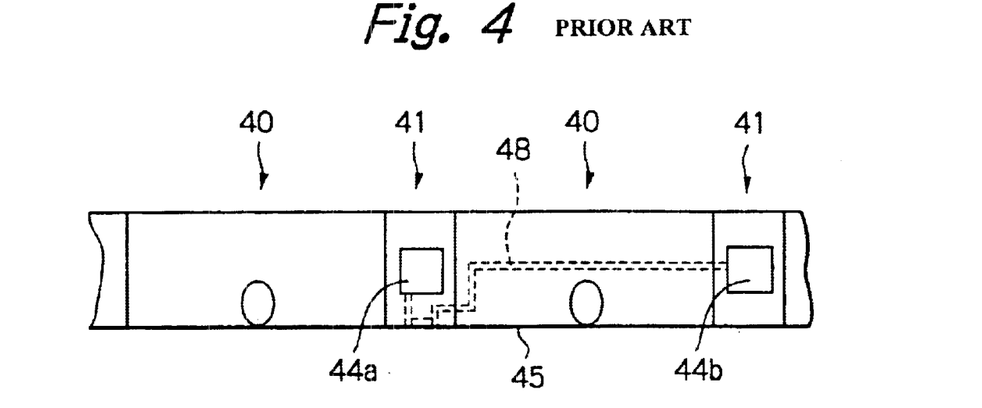
FIG. 4 already disclosed shows a plane view illustrating another layout example of the conventional connection pads.

There may be another arrangement in which resistor-film connection pads 44a and 44b of one lapping sensor are aligned in parallel with a surface to be lapped 45 of a bar by forming the connection pad 44a in one lapping sensor section 41 and by forming the other connection pad 44b in another lapping sensor section 41 as shown in FIG. 4. However, this arrangement will make the resistance of the lapping sensor to increase because of a long lead conductor 48 for connecting the resistor film of the lapping sensor with the connection pad 44b, and also will expose the section of the lead line 48 when the magnetic head section 40 is separated by cutting from the lapping sensor section 41.

SUMMARY OF THE INVENTION

It is therefore an object of the present invention to provide a lapping sensor which can surely and stably detect a correct lapping amount even when a magnetic head slider is to be fabricated is downsized.

Another object of the present invention is to provide a lapping control method using a lapping sensor, whereby an MR height can be surely and stably adjusted to a correct value.

According to the present invention, a lapping sensor used in fabrication of a magnetic head with an MR element includes a resistor film with a resistance that varies depending upon a lapping amount, and a pair of connection pads formed on a element-forming surface of the magnetic head and electrically connected to both end sections of the resistor film. The pair of connection pads consist of a first connection pad and a second connection pad located nearer to a lapping surface than the first connection pad. One edge of the first connection pad is faced to one edge of the second connection pad and inclined toward the lapping surface.

One edge of the first connection pad formed far side from the lapping surface (upper connection pad) is faced to one edge of the second connection pad formed near side from the lapping surface (lower connection pad) and inclined toward the lapping surface. Thus, when wires are bonded to these connection pads, contact of the wire bonded to the lower connection pad with the upper connection pad can be prevented. Namely, by routing the wire bonded to the lower connection pad run along the inclined edge of the upper connection pad, a possibility of contact of this wire with the upper connection pad can be extremely reduced. As a result, a correct lapping amount can be always provided, and therefore an MR height can be surely and stably adjusted to a correct value even when a magnetic head slider to be fabricated is downsized.

It is preferred that the one edge of the first connection pad (upper connection pad) has a linear shape. In this case, more preferably, the one edge of the second connection pad (lower connection pad) has also a linear shape parallel to the one edge of the first connection pad (upper connection pad). Thus, the space between the upper connection pad and the lower connection pad and the space between the lower connection pad and the lapping surface can be widened. Therefore, a possibility of contact of the wire boned to the lower connection pad with the upper connection pad and/or a possibility of contact of this wire with a lapping plate abutted to the lapping surface can be extremely reduced. As a result, a correct lapping amount can be always provided even when a magnetic head slider to be fabricated is downsized.

It is also preferred that each of the first and second connection pads is formed in a triangular shape, and that each of the one edge of the first connection pad and the one edge of the second connection pad corresponds to an oblique side of the triangular shape. In this case, more preferably, the triangular shape is a right triangular shape.

It is preferred that the one edge of the first connection pad has a curved shape. In this case, it is more preferred that each of the first and second connection pads is formed in a circular or oval shape.

It is also preferred that the first and second connection pads are aligned along a direction perpendicular to or inclined toward the lapping surface.

According to the present invention, furthermore, a lapping control method using at least one lapping sensor for fabricating a magnetic head with an MR element includes a step of preparing at least one the aforementioned lapping sensor, a step of connecting bonding wires to the first and second connection pads, respectively so that the bonding wires run along the one edge of the first connection pad, and a step of extracting an electrical signal from the at least one lapping sensor to control the lapped amount.

It is preferred that the method further includes a step of adjusting a height of an MR film in the MR element in accordance with the electrical signal extracted.

Further objects and advantages of the present invention will be apparent from the following description of the preferred embodiments of the invention as illustrated in the accompanying drawings.

DESCRIPTION OF THE PREFERRED EMBODIMENTS

Figure 5:
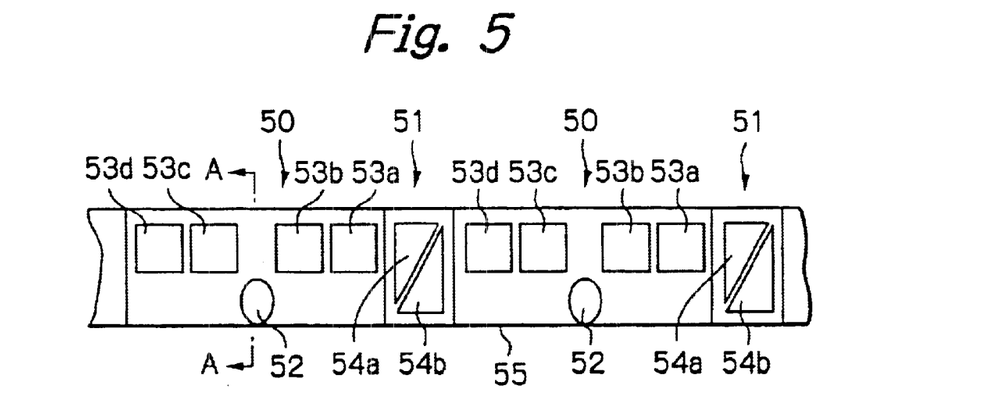
FIG. 5 shows a plane view schematically illustrating an element-forming surface of a part of a bar obtained by cutting in lines an wafer on which many magnetic heads are formed in matrix as a preferred embodiment according to the present invention.
Figure 6:
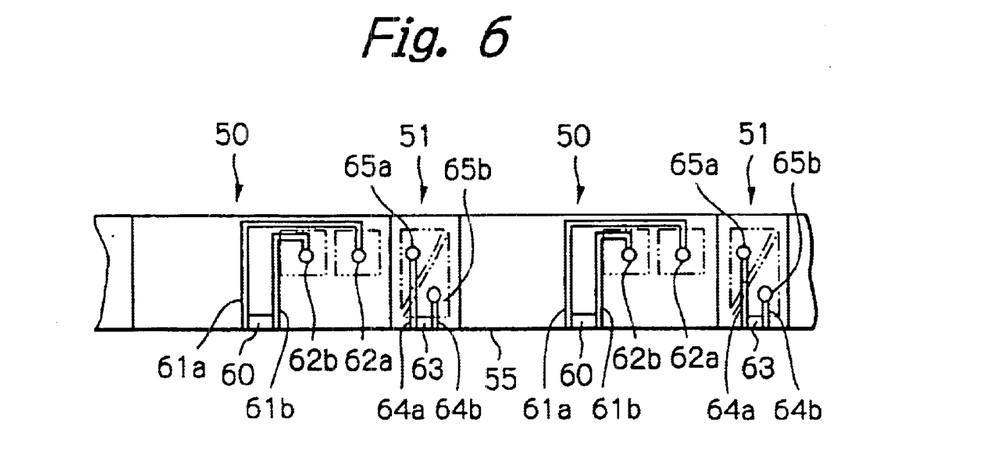
FIG. 6 shows a plane view schematically illustrating an MR film and lead conductors in each magnetic head section and a resistor film and lead conductors in each lapping sensor section in an inwardly located plane from the element-forming surface shown in FIG. 5.
Figure 7:
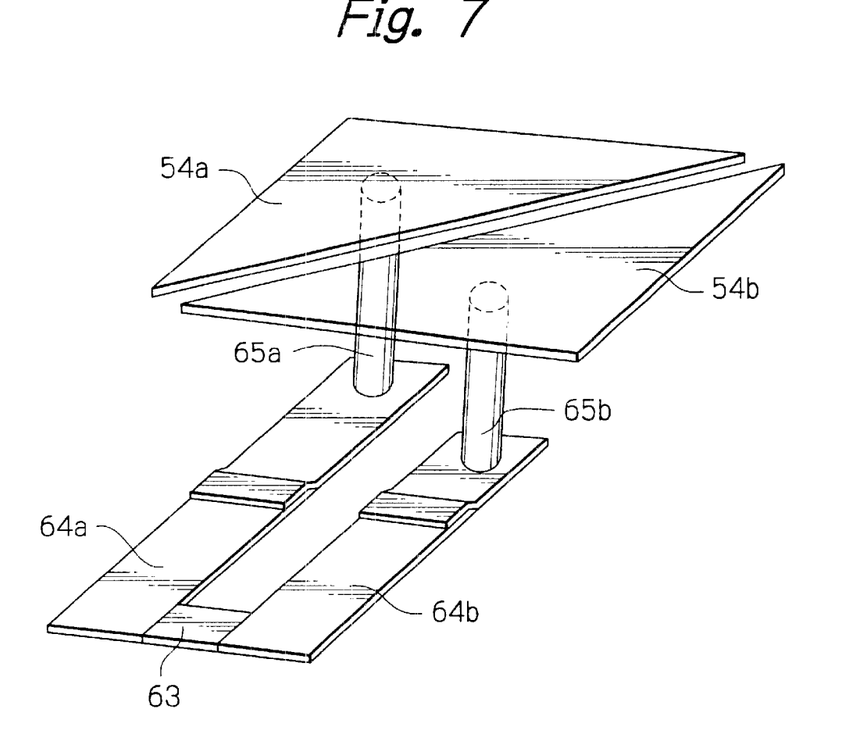
FIG. 7 shows an oblique view illustrating an inward structure of the lapping sensor section.
Figure 8:
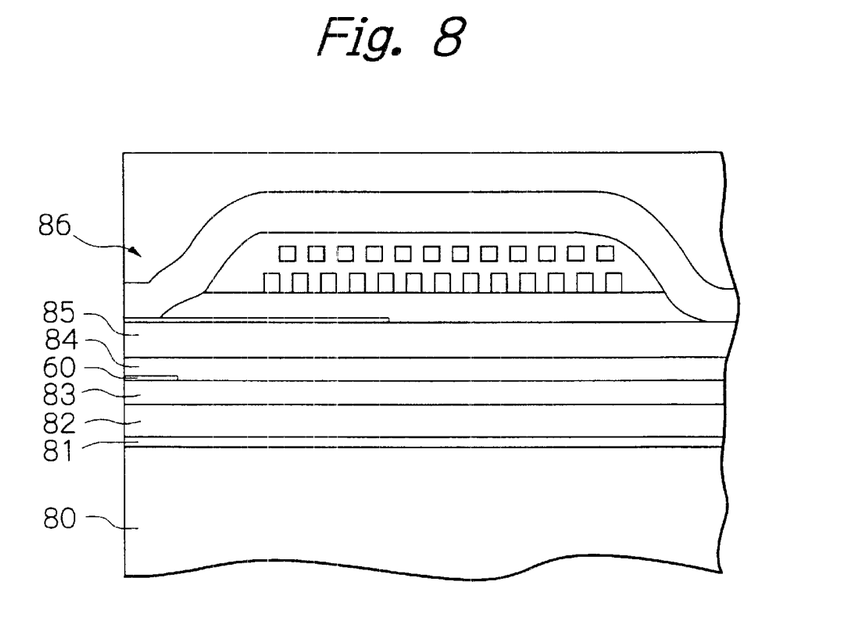
FIG. 8 shows an A—A line sectional view of FIG. 5, illustrating an inward structure of the magnetic head section.

FIG. 5 schematically illustrates an element-forming surface of a part of a bar obtained by cutting in lines an wafer on which many magnetic heads are formed in matrix as a preferred embodiment according to the present invention, FIG. 6 schematically illustrates an MR film and lead conductors in each magnetic head section and a resistor film and lead conductors in each lapping sensor section in an inwardly located plane from the element-forming surface shown in FIG. 5, FIG. 7 illustrates an inward structure of the lapping sensor section, and FIG. 8 is an A—A line sectional view of FIG. 5, illustrating an inward structure of the magnetic head section.

In FIG. 5, reference numerals 50 denote magnetic head sections and 51 denote lapping sensor sections adjacent to the magnetic head sections 50. Each lapping sensor section 51 is formed between the magnetic head sections 50. The lapping sensor section 51 may be additionally formed at both end sections of the bar.

On the element-forming surface of each magnetic head section 50, four magnetic head connection pads 53a–53d electrically connected to a magnetic head element 52 consisting of an MR element and an inductive element are formed. On the element-forming surface of each lapping sensor section 51, two resistor-film connection pads 54a and 54b electrically connected to the resistor film, for extracting an electrical signal from the resistor film are aligned substantially perpendicular to a surface to be lapped (lapping surface) 55 of the bar.

In this embodiment, the resistor-film connection pads 54a and 54b are formed in a right triangular shape to align along a direction perpendicular to the lapping surface 55. The hypotenuses of the right triangle pads 54a and 54b are faced in parallel with each other.

In FIG. 6, reference numerals 60 denote MR films formed in the respective magnetic head sections 50 to run along a direction parallel to the lapping surface 55, 61a and 61b denote lead conductors with one ends connected to the both end sections of the respective MR films 60, 62a and 62b denote connection conductors or via hole conductors connected to the other ends of the respective lead conductors 61a and 61b, 63 denote resistor films formed in the respective lapping sensor sections 51 to run along a direction parallel to the lapping surface 55, 64a and 64b denote lead conductors with one ends connected to the both end sections of the respective resistor films 63, and 65a and 65b denote connection conductors or via hole conductors connected to the other ends of the respective lead conductors 64a and 64b, respectively. The connection conductors 62a and 62b in each magnetic head section 50 are electrically connected to the respective magnetic head connection pads 53a and 53b shown in FIG. 5, and the connection conductors 65a and 65b in each lapping sensor section 51 are electrically connected to the respective resistor-film connection pads 54a and 54b shown in FIG. 5.

Detail structure of the above-mentioned resistor film 63, lead conductors 64a and 64b, connection conductors 65a and 65b, and resistor-film connection pads 54a and 54b in the lapping sensor section 51 are indicated in FIG. 7. The resistor films 63 are made of the same material as that of the MR films 60, and the lead conductors 64a and 64b, connection conductors 65a and 65b and resistor-film connection pads 54a and 54b are made of the same material as that of the lead conductors 61a and 61b, connection conductors 62a and 62b and magnetic head connection pads 53a and 53b. These constituent elements in each lapping sensor section 51 are formed in the same wafer processes as the corresponding constituent elements in each magnetic head section 50.

The magnetic head section 50 are fabricated, as shown in FIG. 8 in detail, by forming a lower shield layer 82 on an under film 81 deposited on an wafer substrate 80, by forming thereon the MR film 60 and lead conductors (not shown in FIG. 8) via a lower shield gap layer 83, by forming thereon an upper shield layer 85 via an upper shield gap layer 84, by forming thereon an inductive element 86 which uses this upper shield layer 85 as a lower pole layer, and by forming other elements such as connection pads (not shown in FIG. 8).

Many magnetic head sections and lapping sensor sections are thus formed on the wafer in matrix, and then the wafer is cut into bars each having aligned magnetic heads and lapping sensors, as shown in FIGS. 5 and 6. Thereafter, lapping control of the MR height (height of the MR film) of each bar is executed as follows.

Figure 9:
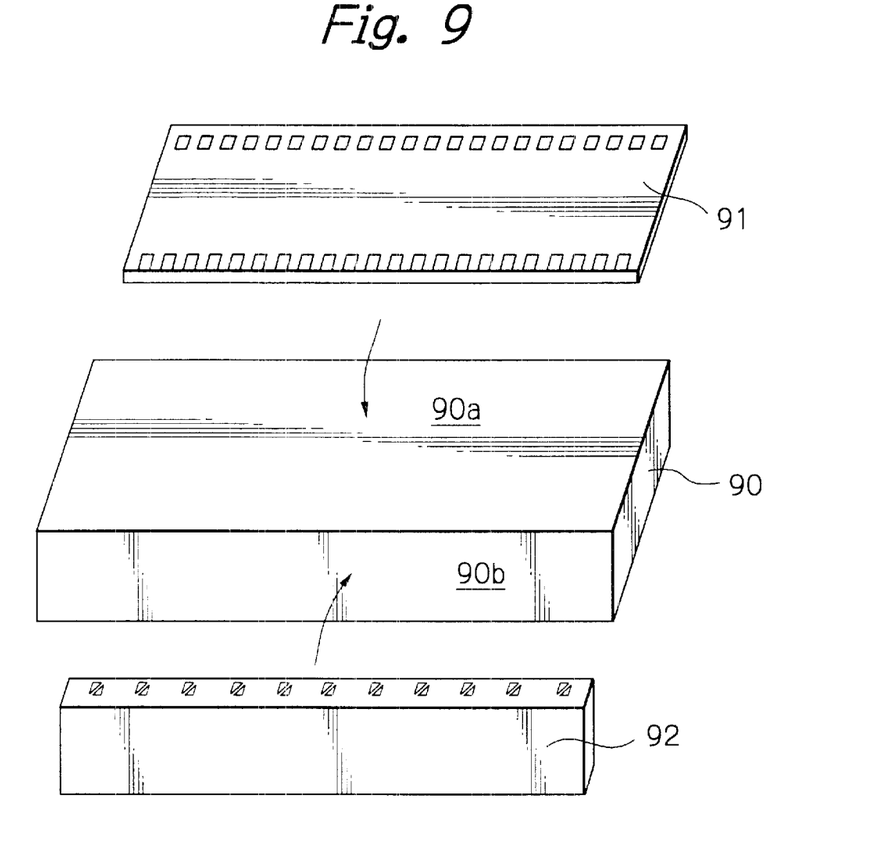
FIG. 9 shows an exploded oblique view illustrating fixing of a bar and a PCB to a lapping jig.
Figure 10:
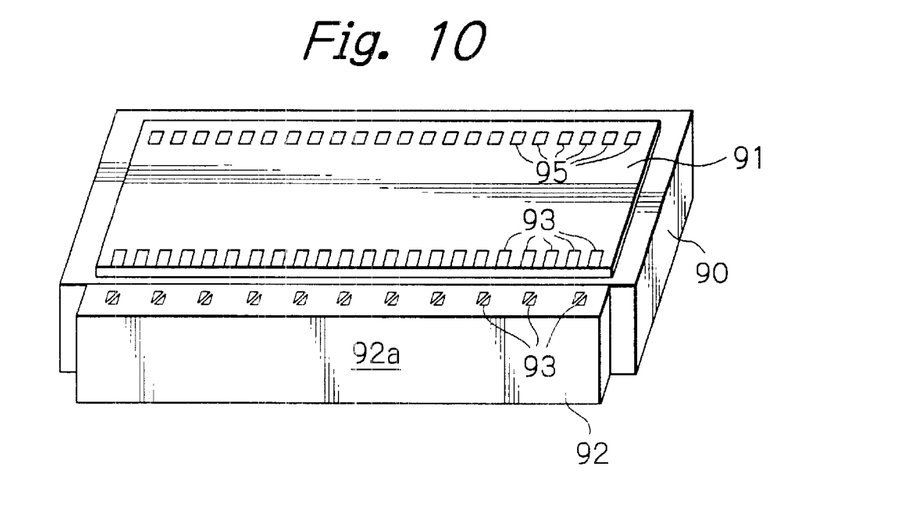
FIG. 10 shows an oblique view illustrating the bar and the PCB fixed to the lapping jig.

First, as shown in FIGS. 9 and 10, a printed circuit board (PCB) for connection 91 is attached to a side surface 90a of a lapping jig 90, and a bar 92 to be lapped is adhered to the bottom face 90b of the jig 90. In this case, the lapping surface of the bar 92 is a surface 92a opposite to the jig 90.

Figure 11:
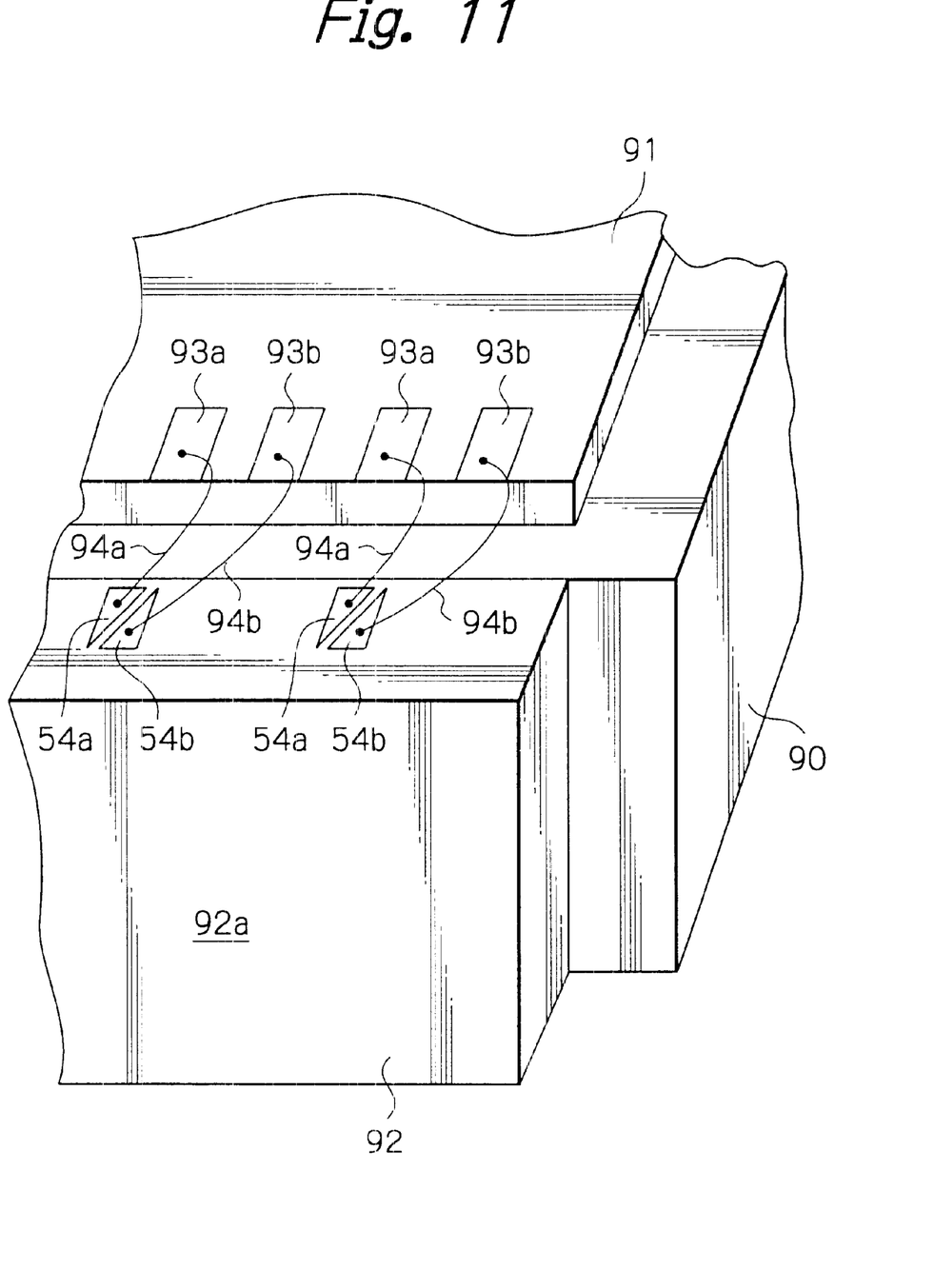
FIG. 11 shows an oblique view illustrating wire-bonding between the resistor-film connection pads of the bar and connection terminals of the PCB.

Then, as its part is shown in FIG. 11, the resistor-film connection pads 54a and 54b formed on the bar 92 are electrically bonded to connection terminals 93a and 93b on the PCB 91 by wires 94a and 94b, respectively. The connection terminals 93a and 93b of the PCB 91 are electrically connected to a lapping control device (not shown) via connection terminals 95 (FIG. 10), respectively.

Figure 12:
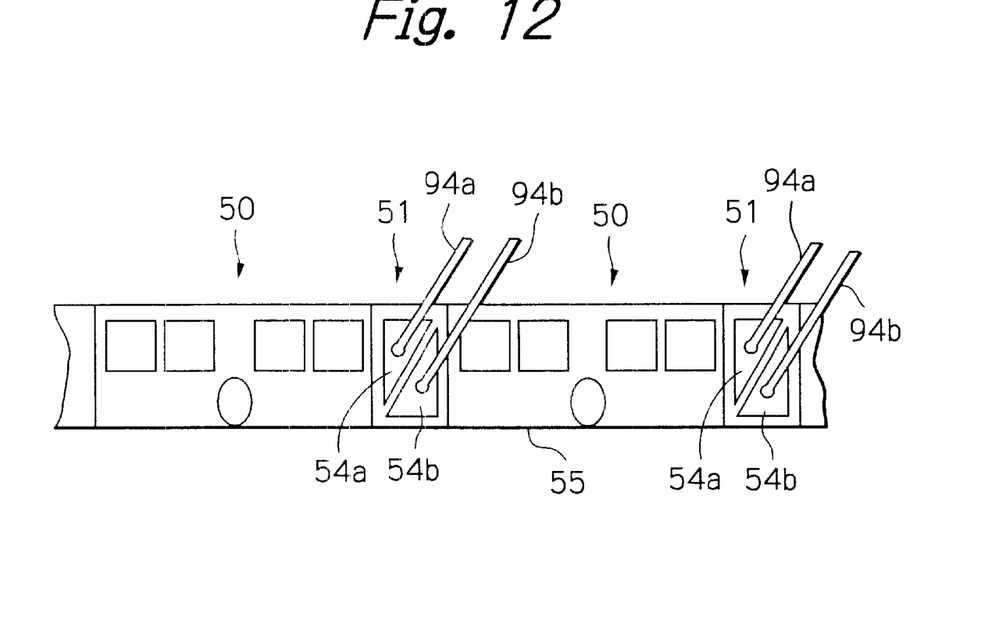
FIG. 12 shows a plane view illustrating a wiring direction of the bonding wires bonded to the resistor-film connection pads of the bar.

When bonding the wires 94a and 94b to the resistor-film connection pads 54a and 54b on the bar 92, the wires 94a and 94b are routed substantially in parallel with the respective hypotenuses of the right triangle pads 54a and 54b as more clearly shown in FIG. 12. Thus, the wire 94b connected to the lower connection pad 54b will not contact with the upper connection pad 54a in most cases.

Since the resistor-film connection pads 54a and 54b in this embodiment are formed in a right triangular shape so that their hypotenuses are faced to each other, sufficiently effective area of each connection pad can be provided even if the area of the element-forming surface of the lapping sensor section is small. In other words, the space between the upper connection pad 54a and the lower connection pad 54b and/or the space between the lower connection pad 54b and the lapping surface 55 can be widened. Therefore, even if the wire bonding machine has a limited accuracy in bonding, no short circuit of the wire 94b will occur. Furthermore, since the two right triangle connection pads 54a and 54b are aligned along a direction perpendicular to the lapping surface 55 in this embodiment, these connection pads 54a and 54b can be formed to have a large area with effectively utilizing the lateral width of each lapping sensor section 51. As a result, short circuit between these connection pads and the wires can be more effectively prevented.

Figure 13:
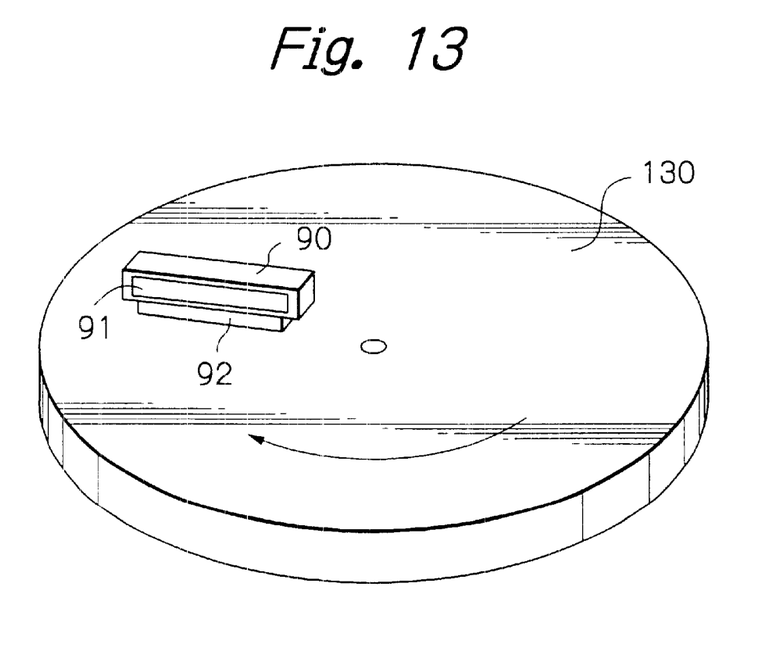
FIG. 13 shows an oblique view illustrating actual lapping of the bar.

The bar 92 attached and electrically connected to the lapping jig 90 as aforementioned is then lapped as shown in FIG. 13. Namely, the lapping surface 92a of the bar 92 is abutted to the surface of a rotating lapping plate 130 and thus this surface 92a is lapped to adjust the MR height. During this lapping, the lapped amount is detected by the resistor film in the lapping sensor section and an electrical signal representing the detected lapped amount is applied to the lapping control device through the resistor-film connection pads 54a and 54b, the wires 94a and 94b and the PCB 91 so that the lapped amount is feedback-controlled.

As mentioned above, according to this embodiment, since no short circuit will occur on the wires 94a and 94b connected to the resistor-film connection pads 54a and 54b, correct lapping amount can be always measured and thus the MR height can be surely and stably adjusted to a correct value.

FIGS. 14a to 14g illustrate various shapes of resistor-film connection pads in modifications according to the present invention.

Figure 14A:
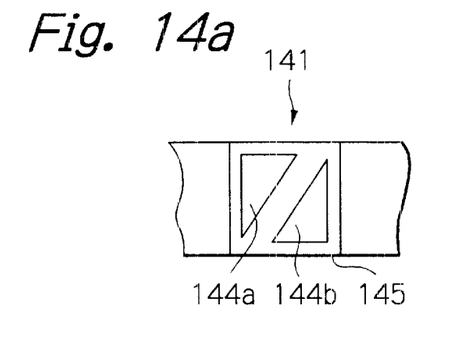
FIGS. 14a to 14g show plane views illustrating various shapes of resistor-film connection pads in modifications according to the present invention.

In the modification shown in FIG. 14a, resistor-film connection pads 144a and 144b in each lapping sensor section 141 are formed in a right triangular shape so that their hypotenuses are faced to each other, and are aligned in a slanting direction with respect to a lapping surface 145. Therefore, in this modification, effective utilization of the lateral width of each lapping sensor section 141 cannot be expected as the embodiment of FIGS. 5 and 6. However, since the space between the upper connection pad 144a and the lower connection pad 144b and the space between the lower connection pad 144b and the lapping surface 145 can be more widened, short circuit between these connection pads and the wires can be more effectively prevented.

Figure 14B:
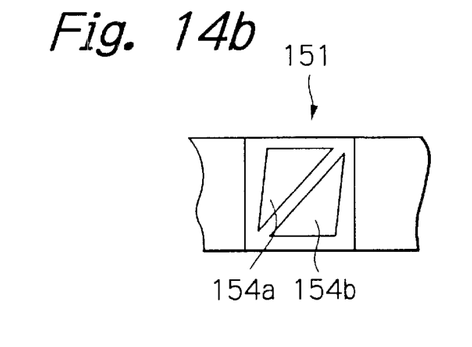

In the modification shown in FIG. 14b, resistor-film connection pads 154a and 154b in each lapping sensor section 151 are formed in a triangular shape other than a right triangle so that their oblique sides are faced to each other, and are aligned in a slanting direction with respect to a lapping surface 155. Therefore, in this modification, effective utilization of the lateral width of each lapping sensor section 151 cannot be obtained as the embodiment of FIGS.

5 and 6. Except for this, the same advantages as the embodiment of FIGS. 5 and 6 can be expected in this modification.

Figure 14C:
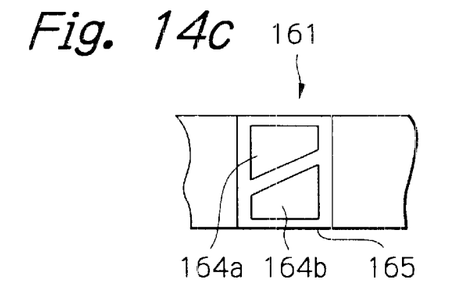

In the modification shown in FIG. 14c, resistor-film connection pads 164a and 164b in each lapping sensor section 161 are formed in a rectangular shape so that their oblique linear sides slanting with respect to a lapping surface 165 are faced to each other. The same advantages as the embodiment of FIGS. 5 and 6 can be expected in this modification.

Figure 14D:
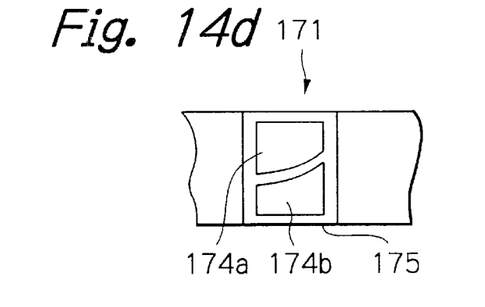

In the modification shown in FIG. 14d, resistor-film connection pads 174a and 174b in each lapping sensor section 171 are formed in a rectangular shape so that their oblique curved sides slanting with respect to a lapping surface 175 are faced to each other. The same advantages as the embodiment of FIGS. 5 and 6 can be expected in this modification.

Figure 14E:
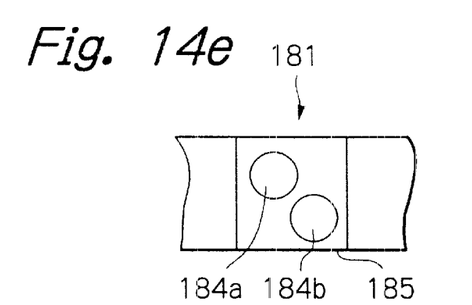

In the modification shown in FIG. 14e, resistor-film connection pads 184a and 184b in each lapping sensor section 181 are formed in a circular shape, and are aligned in a slanting direction with respect to a lapping surface 185. Therefore, in this modification, effective utilization of the lateral width of each lapping sensor section 181 cannot be expected as the embodiment of FIGS. 5 and 6. However, since the space between the upper connection pad 184a and the lower connection pad 184b and the space between the lower connection pad 184b and the lapping surface 185 can be more widened, short circuit between these connection pads and the wires can be more effectively prevented.

Figure 14F:
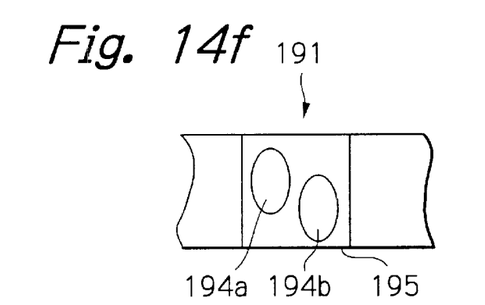

In the modification shown in FIG. 14f, resistor-film connection pads 194a and 194b in each lapping sensor section 191 are formed in an oval shape with a long axis perpendicular to a lapping surface 195, and are aligned in a slanting direction with respect to the lapping surface 195. Therefore, in this modification, effective utilization of the lateral width of each lapping sensor section 191 cannot be expected as the embodiment of FIGS. 5 and 6. However, since the space between the upper connection pad 194a and the lower connection pad 194b and the space between the lower connection pad 194b and the lapping surface 195 can be more widened, short circuit between these connection pads and the wires can be more effectively prevented.

Figure 14G:
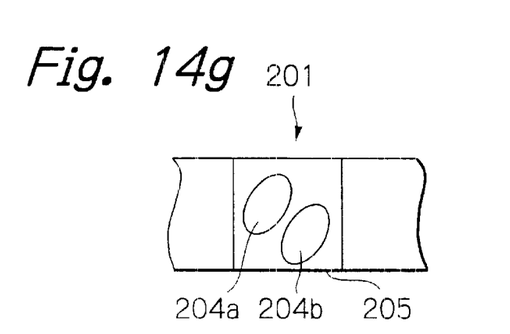

In the modification shown in FIG. 14g, resistor-film connection pads 204a and 204b in each lapping sensor section 201 are formed in an oval shape with a long axis in a slanting to a lapping surface 205, and are aligned in a slanting direction with respect to the lapping surface 205. Therefore, in this modification, effective utilization of the lateral width of each lapping sensor section 201 cannot be expected as the embodiment of FIGS. 5 and 6. However, since the space between the upper connection pad 204a and the lower connection pad 204b and the space between the lower connection pad 204b and the lapping surface 205 can be more widened, short circuit between these connection pads and the wires can be more effectively prevented.

It is apparent that the shape of the resistor-film connection pads in the lapping sensor section according to the present invention will not limited to the above-mentioned embodiment and modifications but various shapes can be adopted.

Many widely different embodiments of the present invention may be constructed without departing from the spirit and scope of the present invention. It should be understood that the present invention is not limited to the specific embodiments described in the specification, except as defined in the appended claims.

What is claimed is:

1. A lapping sensor used in fabrication of a magnetic head with a magnetoresistive effect element, comprising:
    a resistor film with a resistance that varies depending upon a lapping amount; and
    a pair of connection pads formed on a element-forming surface of said magnetic head and electrically connected to both end sections of said resistor film, said pair of connection pads consisting of a first connection pad and a second connection pad located nearer to a lapping surface than said first connection pad, one edge of said first connection pad being faced to one edge of said second connection pad and inclined toward said lapping surface.

2. The sensor as claimed in claim 1, wherein said one edge of said first connection pad has a linear shape.

3. The sensor as claimed in claim 2, wherein said one edge of said second connection pad has a linear shape parallel to said one edge of said first connection pad.

4. The sensor as claimed in claim 3, wherein each of said first and second connection pads is formed in a triangular shape, and wherein each of said one edge of said first connection pad and said one edge of said second connection pad corresponds to an oblique side of said triangular shape.

5. The sensor as claimed in claim 4, wherein said triangular shape is a right triangular shape.

6. The sensor as claimed in claim 1, wherein said one edge of said first connection pad has a curved shape.

7. The sensor as claimed in claim 6, wherein each of said first and second connection pads is formed in a circular or oval shape.

8. The sensor as claimed in claim 1, wherein said first and second connection pads are aligned along a direction perpendicular to said lapping surface.

9. The sensor as claimed in claim 1, wherein said first and second connection pads are aligned along a direction inclined toward said lapping surface.

10. A lapping control method using at least one lapping sensor for fabricating a magnetic head with a magnetoresistive effect element, said method comprising the steps of:
    preparing at least one lapping sensor including a resistor film with a resistance that varies depending upon a lapping amount, and a pair of connection pads formed on a element-forming surface of said magnetic head and electrically connected to both end sections of said resistor film, said pair of connection pads consisting of a first connection pad and a second connection pad located nearer to a lapping surface than said first connection pad, one edge of said first connection pad being faced to one edge of said second connection pad and inclined toward said lapping surface;
    connecting bonding wires to said first and second connection pads, respectively so that said bonding wires run along said one edge of said first connection pad; and
    extracting an electrical signal from said at least one lapping sensor to control the lapped amount.

11. The method as claimed in claim 10, wherein said method further comprises a step of adjusting a height of a magnetoresistive effect film in said magnetoresistive effect element in accordance with said electrical signal extracted.

12. The method as claimed in claim 10, wherein said preparing step comprises preparing said lapping sensor in which said one edge of said first connection pad has a linear shape.

13. The method as claimed in claim 12, wherein said preparing step comprises preparing said lapping sensor in which said one edge of said second connection pad has a linear shape parallel to said one edge of said first connection pad.

14. The method as claimed in claim 13, wherein said preparing step comprises preparing said lapping sensor in which each of said first and second connection pads is formed in a triangular shape, and each of said one edge of said first connection pad and said one edge of said second connection pad corresponds to an oblique side of said triangular shape.

15. The method as claimed in claim 14, wherein said preparing step comprises preparing said lapping sensor in which said triangular shape is a right triangular shape.

16. The method as claimed in claim 10, wherein said preparing step comprises preparing said lapping sensor in which said one edge of said first connection pad has a curved shape.

17. The method as claimed in claim 16, wherein said preparing step comprises preparing said lapping sensor in which each of said first and second connection pads is formed in a circular or oval shape.

18. The method as claimed in claim 10, wherein said preparing step comprises preparing said lapping sensor in which said first and second connection pads are aligned along a direction perpendicular to said lapping surface.

19. The method as claimed in claim 10, wherein said preparing step comprises preparing said lapping sensor in which said first and second connection pads are aligned along a direction inclined toward said lapping surface.

* * * * *